United States Patent
Targali et al.

(10) Patent No.: US 10,887,768 B2
(45) Date of Patent: Jan. 5, 2021

(54) MOBILE TRAFFIC REDIRECTION SYSTEM (71) Applicant: T-Mobile USA, Inc., Bellevue, WA (US)

(72) Inventors: Yousif Targali, Sammamish, WA (US); Salvador Mendoza, Issaquah, WA (US); Matthew Kirchberg, Milton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 43 days.

(21) Appl. No.: 15/479,031

(22) Filed: Apr. 4, 2017

(65) Prior Publication Data

US 2018/0020355 A1  Jan. 18, 2018

Related U.S. Application Data (60) Provisional application No. 62/361,689, filed on Jul. 13, 2016.

(51) Int. Cl.
*H04W 12/08* (2009.01)
*H04L 29/06* (2006.01)
(Continued)

(52) U.S. Cl.
CPC ......... *H04W 12/08* (2013.01); *H04L 47/2475* (2013.01); *H04L 63/0209* (2013.01);
(Continued)

(58) Field of Classification Search
CPC ..... H04W 12/08; H04W 12/04; H04W 12/12; H04L 47/2475; H04L 63/0209;
(Continued)

(56) References Cited

U.S. PATENT DOCUMENTS 8,065,712 B1  11/2011 Cheng et al.
9,692,791 B1 *  6/2017 Mishra ................ H04L 63/1425
(Continued)

FOREIGN PATENT DOCUMENTS

KR       100959477       5/2010
WO    WO2011050235 A1   4/2011
(Continued)

OTHER PUBLICATIONS

Remy et al, LTE Standards, 2014, Wiley, p. 12 (Year: 2014).*
(Continued)

*Primary Examiner* — Ashokkumar B Patel
*Assistant Examiner* — William B Jones
(74) *Attorney, Agent, or Firm* — Lee & Hayes, P.C.

(57) ABSTRACT

The systems, devices, and methods discussed herein are directed to redirecting mobile traffic of an infected mobile device, or user equipment (UE), to a security network node, which provides a security action for the UE. A mobile session management node may identify the UE as an infected device based on a database maintained at an intelligent redirection node or a security posture indicator received from the UE. The mobile management entity may then create a session with a security network node which redirects mobile traffic of the infected UE to the security network node and provides a security action for the UE.

18 Claims, 10 Drawing Sheets

(51) Int. Cl.
*H04L 29/08* (2006.01)
*H04W 12/12* (2009.01)
*H04L 12/859* (2013.01)
*H04W 8/04* (2009.01)

(52) U.S. Cl.
CPC ........ *H04L 63/0254* (2013.01); *H04L 63/101* (2013.01); *H04L 63/1441* (2013.01); *H04L 63/20* (2013.01); *H04L 67/22* (2013.01); *H04W 12/1202* (2019.01); *H04W 12/1204* (2019.01); *H04W 12/1208* (2019.01); *H04W 8/04* (2013.01)

(58) Field of Classification Search
CPC ............... H04L 63/0254; H04L 63/101; H04L 63/1441; H04L 63/20; H04L 67/22
See application file for complete search history.

(56) References Cited

U.S. PATENT DOCUMENTS

| | | | |
|---|---|---|---|
| 2005/0210127 A1* | 9/2005 | Pohja | H04L 63/304 709/224 |
| 2007/0097976 A1 | 5/2007 | Wood et al. | |
| 2007/0169169 A1* | 7/2007 | Zheng | H04W 12/1208 726/1 |
| 2010/0251329 A1 | 9/2010 | Wei | |
| 2013/0091534 A1 | 4/2013 | Gilde et al. | |
| 2013/0265954 A1* | 10/2013 | Dahlen | H04W 48/14 370/329 |
| 2014/0237545 A1 | 8/2014 | Mylavarapu et al. | |
| 2015/0111533 A1 | 4/2015 | Chandramouli et al. | |
| 2018/0295659 A1* | 10/2018 | Shan | H04L 12/1407 |

FOREIGN PATENT DOCUMENTS

| | | |
|---|---|---|
| WO | WO2015182111 | 12/2015 |
| WO | WO2016081837 A1 | 5/2016 |

OTHER PUBLICATIONS

3GPP (TM), "3rd Generation Partnership Project; Technical Specification Group Services and System Aspects; 3GPP System Architecture Evolution (SAE); Security architecture (Release 14)," 3GPP TS 33.401 V14.1.0, Dec. 2016. 152 pages.
3GPP (TM), "3rd Generation Partnership Project; Technical Specification Group Services and System Aspects; General Packet Radio Service (GPRS) enhancements for Evolved Universal Terrestrial Radio Access Network (E-UTRAN) access (Release 14)," 3GPP TS 23.401 V14.2.0. Dec. 2016, 385 pages.
PCT Search Report and Written Opinion dated Oct. 19,1 2017 for PCT application No. PCT/US2017/040669, 12 pages.
European Search Report from the European Patent Office for Application No. 17828188.7, dated Oct. 21, 2019, a counterpart of U.S. Appl. No. 15/479,031, 8 pages.

* cited by examiner

MOBILE TRAFFIC REDIRECTION SYSTEM

CROSS-REFERENCE TO RELATED APPLICATIONS

This application is a non-provisional of, and claims priority to and the benefit of, U.S. Provisional Patent Application Ser. No. 62/361,689, filed Jul. 13, 2016 and entitled "INTELLIGENT MOBILE REDIRECTION SYSTEM" the entirety of which is incorporated herein by reference.

BACKGROUND

Modern telecommunication systems may include heterogeneous mixtures of second, third, fourth, and fifth generation (2G, 3G, 4G, and 5G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, LTE in Unlicensed Spectrum (LTE-U), Licensed Assisted Access (LAA), and Evolved High-Speed Packet Access (HSPA+) are examples of 4G telecommunications technologies. The 5G telecommunication technologies are the next generation mobile networks that are designed to combine both an evolution and revolution of the existing LTE/LTE-A mobile networks to provide a much higher connectivity, greater throughput, much lower latency, and ultra-high reliability to support new use cases and applications.

The growth and widespread adoption of mobile devices, such as smartphones and tablets, and accessing the Internet using those mobile devices, have exposed the mobile devices to the threat of being infected by various malware and malicious applications, which may be unintentionally and unknowingly downloaded to the mobile devices. Such infected mobile devices pose a threat to both the users and the mobile operators of the mobile devices by potentially attacking the mobile operator networks, the infected mobile devices, infecting other mobile devices, stealing identifications and other information of the mobile device users, and the like. The increasing threat has resulted in mobile operators deploying security devices to detect and block infected mobile devices from attacking mobile operator network or other mobile users, however, providing full coverage and protection measures for mobile traffic for millions of mobile users is difficult and expensive.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The systems, devices, and methods discussed herein are directed to redirecting mobile traffic of an infected mobile device, or user equipment (UE), to a security network node, which provides a security action for the UE. A mobility session management node, such as a mobile management entity (MME) for the LTE network, responsible for subscriber authentication, roaming and handovers to other networks, may identify the UE as an infected device based on a database maintained at an intelligent redirection node (IRN) or a security posture indicator (SPI) received from the UE. The MIME may then create a session with a security network node (SNN) which redirects mobile traffic of the infected UE to the SNN and provides a security action for the UE.

Figure 1:
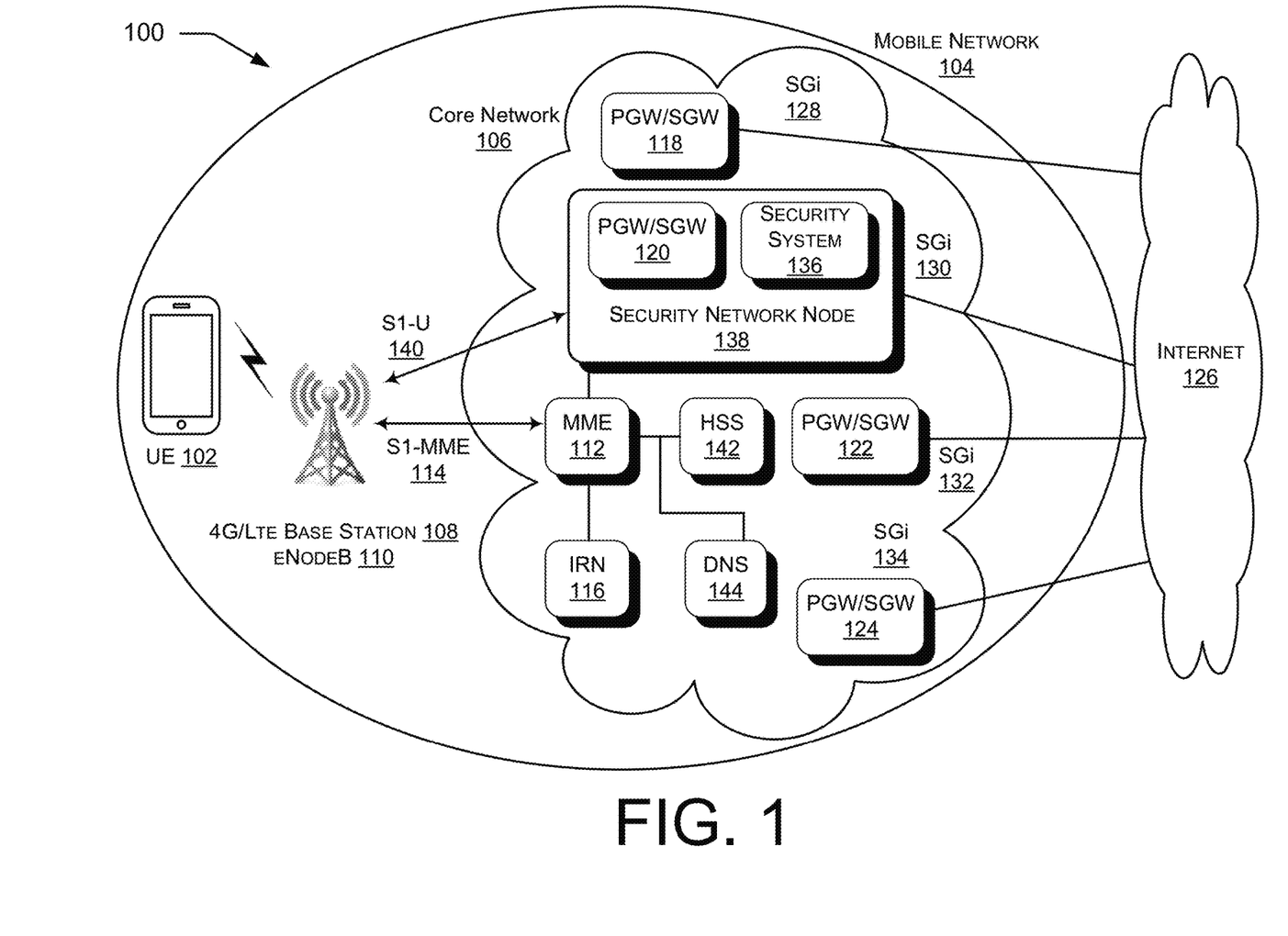
FIG. 1 illustrates an example environment in which mobile traffic of an infected user equipment (UE), may be redirected.

FIG. 1 illustrates an example environment 100 in which mobile traffic of an infected user equipment (UE) 102, may be redirected.

The UE 102 may be a portable communication device, such as a cellular telephone, a tablet or laptop computer, a global positioning system (GPS) device, a game device, and the like, which is capable of communicating with a mobile network 104 of a mobile network operator (MNO). The UE 102 may access a core network 106 of the MNO, via an access point, such as a 4G/LTE base station 108 with an evolved node B (eNodeB) 110 of the mobile network 104. The UE may establish communication with a mobile management entity (MME) 112 of the core network 106 via an S1-MME interface 114 through the mobile network 104. The MME 112 is coupled to an intelligent redirection node (IRN) 116, which is capable of determining whether the UE 102 is infected. The core network 106 may also include a plurality of packet data network gateways (PGWs) and serving gateways (SGWs), of which, four PGW/SGWs, 118, 120, 122, and 124, are shown. Each PGW/SGW may connect to a packet data network, such as the Internet 126, via an SGi interface, 128, 130, 132, and 134. One of the PGW/SGWs, such as the PGW/SGW 120, may include a security system 136, and the combination of the PGW/SGW 120 and the security system 136 may be referred as a security network node (SNN) 138. If the IRN 116 determine that the UE 102 is infected, then the IRN 116 may instruct the MME 112 to redirect mobile traffic of the UE 102 to the SNN 138. The mobile traffic of the UE 102 may be redirected, via a S1-U interface 140, to the SNN 138 where the SNN 138 may provide a security action for the UE 102. The MME 112 may also be connected to a home subscriber server (HSS) 142 and a domain name system (DNS) 144.

Figure 2:
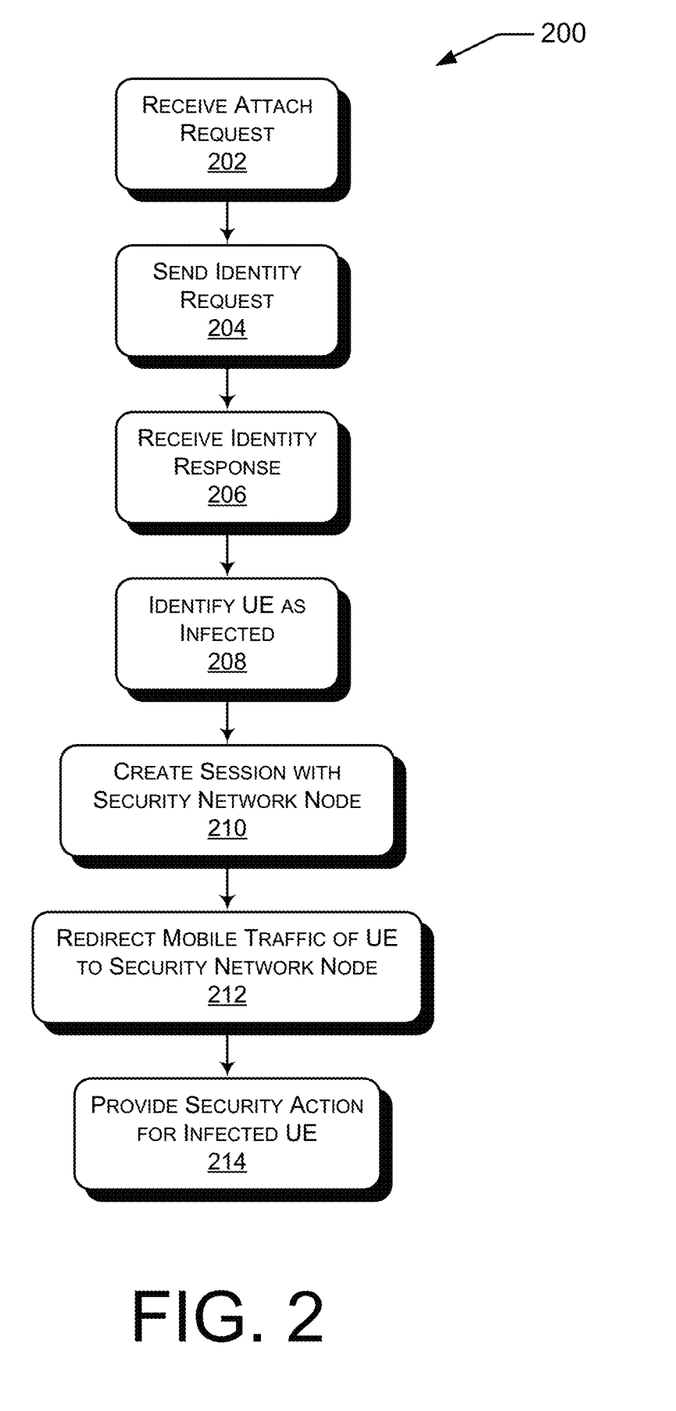
FIG. 2 illustrates an example flow chart process for the mobile management entity for redirecting the mobile traffic of the infected UE to a security network node.

FIG. 2 illustrates an example flow chart process 200 for the MME 112 for redirecting the mobile traffic of the infected UE 102 to the SNN 128.

In block 202, the MME 112 receives an attach request from the UE 102, and in response, sends an identity request to the UE 102 in block 204. The MME 112 then receives an identity response from the UE 102 in block 206 in response to the identity request. Based on the identity response, the MME 112 authenticates the UE 102 and identifies the UE 102 as an infected device in block 208. The MME 112 creates a session with the SNN 138 in block 210, and redirects the mobile traffic of the infected UE 102 to the SNN 138 in block 212. The SNN 138 provides, or the MIME 112 causes the SNN 138 to provide, a security action for the infected UE 102 in block 214.

The security action provided by the SNN 138 for the infected UE 102 may include inspecting the mobile traffic of the UE 102 for malicious traffic and identifying a known malicious website destination included in the mobile traffic from the UE 102, or malicious traffic designed for a botnet, a distributed denial-of service attack (DDoS), a malware, and the like. The SNN 138 may also monitor for such malicious traffic destined for websites or other UEs.

The security action provided by the SNN 138 for the infected UE 102 may also include remedial actions such as quarantining the mobile traffic of the UE 102, blocking the mobile traffic of the UE 102, providing a notification to run a security application on the UE 102 to remove the infection, and automatically running the security application on the UE 102 to remove the infection such as a malware. The SNN 138 may also provide a notification of the remedial action taken by sending a notification of the remedial action provided to the UE 102, by sending a notification of the remedial action provided to the user associated with the UE 102 by a text, an email, a status update on the user's account, and the like, and by creating a report of the remedial action provided to the UE 102 for the mobile network operator of the UE 102.

Figure 3:
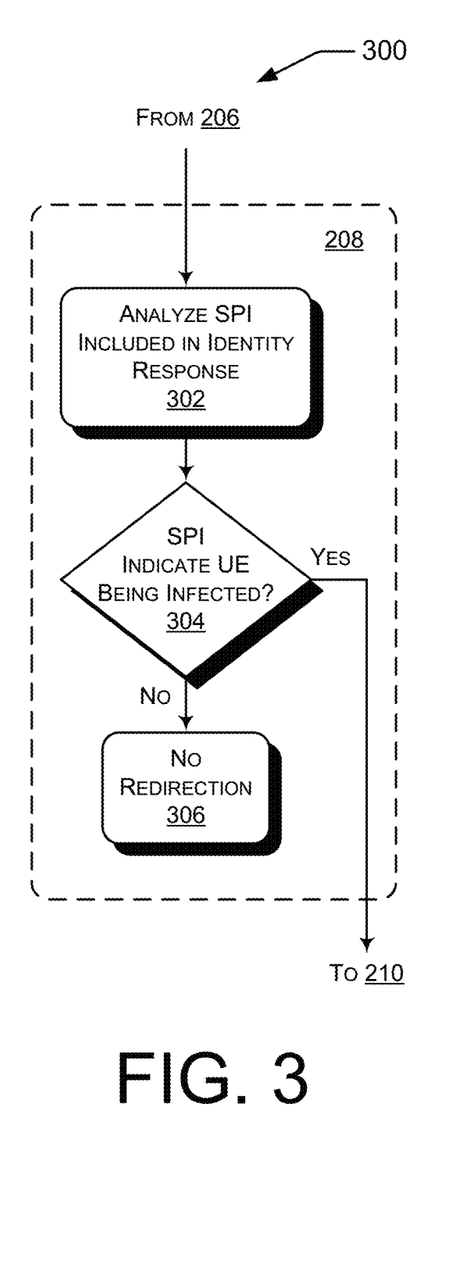
FIG. 3 illustrates a first example process detailing one of the blocks of FIG. 2 for identifying the UE as an infected device based on the identity response.

FIG. 3 illustrates a first example process 300 detailing block 208 of FIG. 2 for identifying the UE 102 as an infected device based on the identity response.

In block 302, the MME 112 analyzes a security posture indicator (SPI) included in the identity response received from the UE 102. If the SPI indicates that the UE 102 is not infected in block 304, the process terminates in block 306 with no redirection for the mobile traffic of the UE 102 being required. If the SPI indicates that the UE 102 is infected in block 304, then the process proceeds to block 210 having the UE 102 identified as infected.

Figure 4:
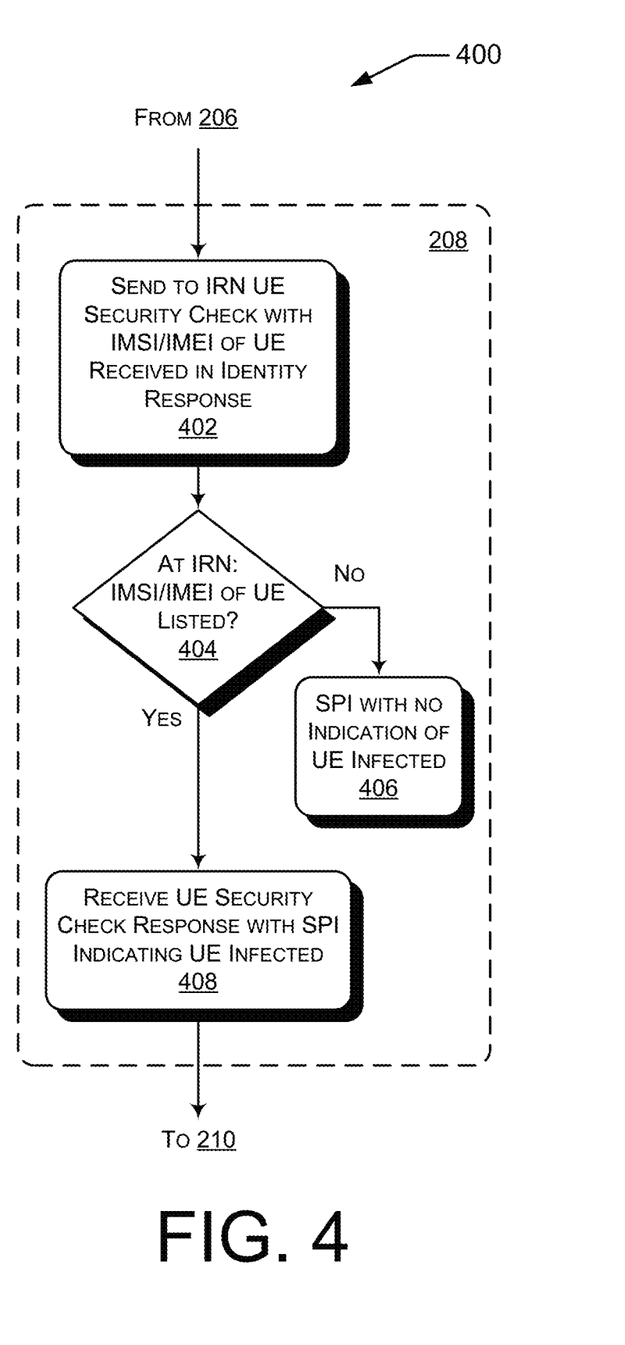
FIG. 4 illustrates a second example process detailing one of the blocks of FIG. 2 for identifying the UE as an infected device based on the identity response.

FIG. 4 illustrates a second example process 400 detailing block 208 of FIG. 2 for identifying the UE 102 as an infected device based on the identity response.

In block 402, the MME 112 sends to an intelligent redirection node (IRN) 116 a UE security check including a mobile identity comprising at least one of an international mobile subscriber identity (IMSI) or an international mobile equipment identity (IMEI) of the UE 102 received in the identity response. In 404, the IRN 116 determines if the IMSI/IMEI of the UE 102 is included in a list of known infected UEs maintained at the IRN 116. If the IMSI/IMEI of the UE 102 is not included in the list, then the SPI includes no indication of the UE 102 being infected in block 406 with no redirection for the mobile traffic of the UE 102 being required. However, if the IMSI/IMEI of the UE 102 is included in the list, then the SPI includes an indication that the UE 102 is infected. In block 408, the MME 112 receives from the IRN 116 a UE security check response including the SPI that indicates the UE 102 being infected.

Figure 5:
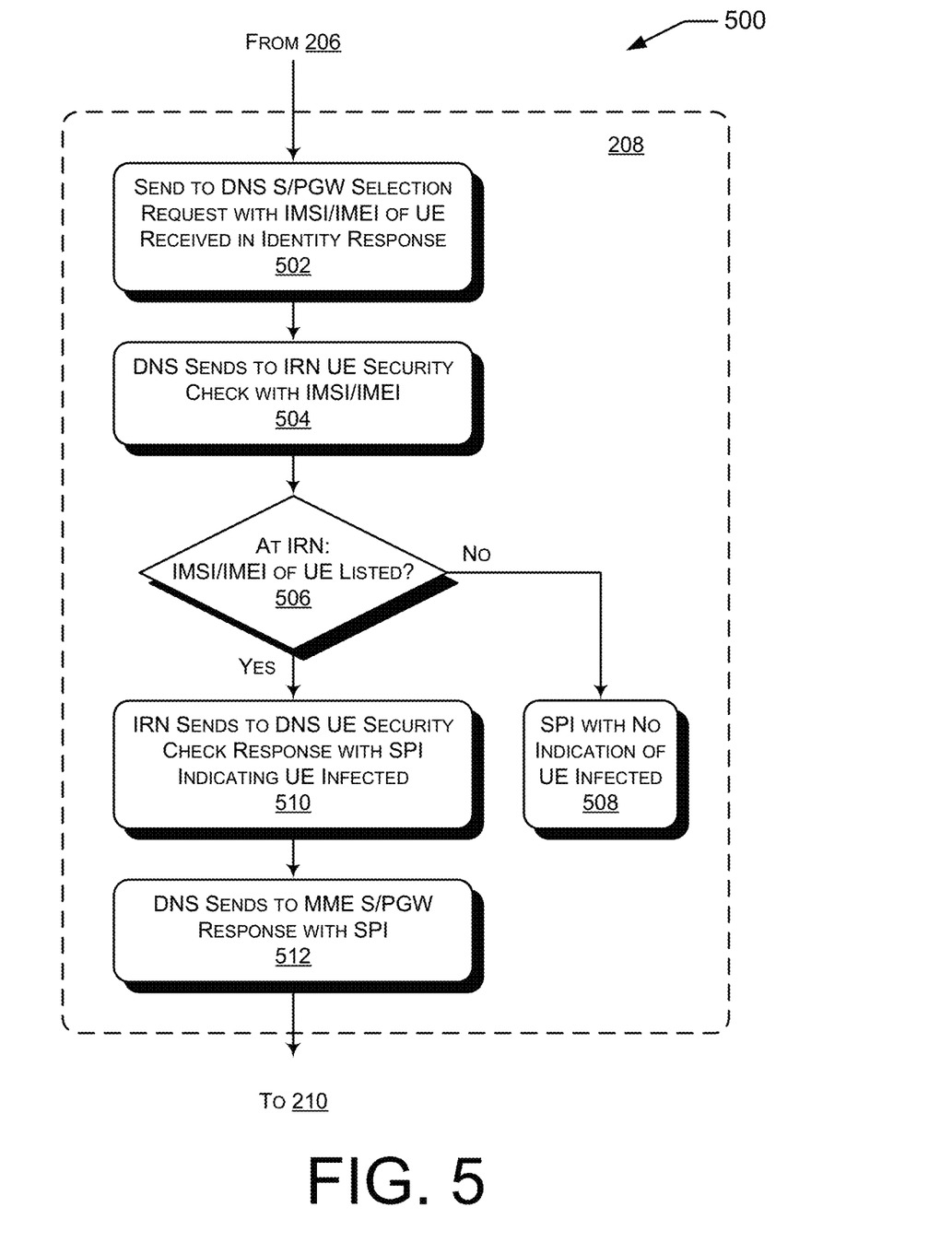
FIG. 5 illustrates a third example process detailing one of the blocks of FIG. 2 for identifying the UE as an infected device based on the identity response.

FIG. 5 illustrates a third example process 500 detailing block 208 of FIG. 2 for identifying the UE 102 as an infected device based on the identity response.

In block 502, the MME 112 sends, to the DNS 144, an SGW and PGW (S/PGW) selection request including the IMSI/IMEI of the UE 102 received in the identity response, and causes the DNS 144 to send, to the IRN 116, a UE security check including the IMSI/IMEI of the UE in block 504. In 506, the IRN 116 determines if the IMSI/IMEI of the UE 102 is included in a list of known infected UEs maintained at the IRN 116. If the IMSI/IMEI of the UE 102 is not included in the list, then the SPI includes no indication of the UE 102 being infected in block 508 with no redirection for the mobile traffic of the UE 102 being required. However, if the IMSI/IMEI of the UE 102 is included in the list, then the SPI includes an indication that the UE 102 is infected. In block 510, the IRN 116 sends to the DNS 144 a UE security check response including the SPI that indicates the UE 102 being infected. In block 512, the DNS 144 sends to the MME 112 an S/PGW selection response including the SPI.

Figure 6:
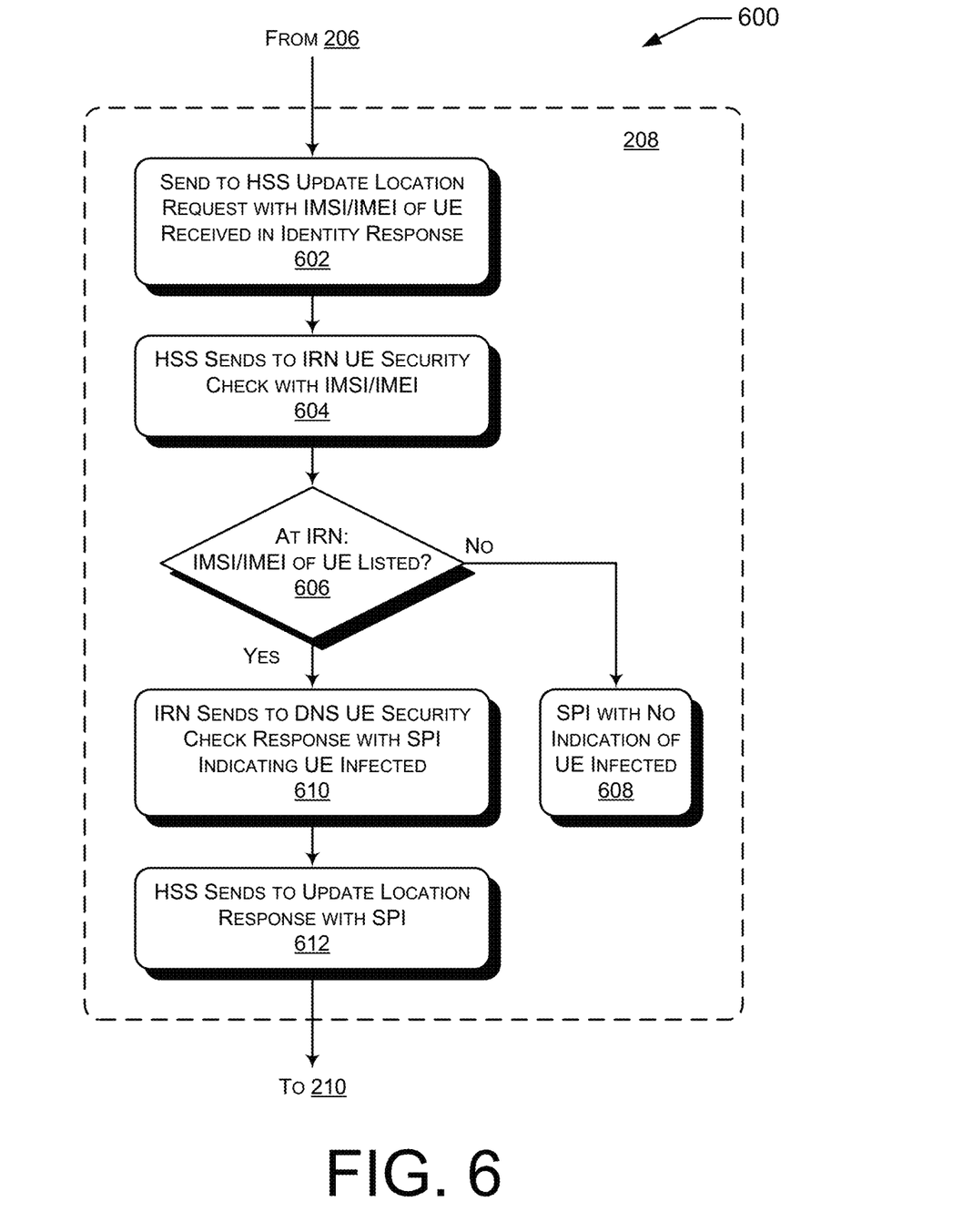
FIG. 6 illustrates a fourth example process detailing one of the blocks of FIG. 2 for identifying the UE as an infected device based on the identity response.

FIG. 6 illustrates a fourth example process 600 detailing block 208 of FIG. 2 for identifying the UE 102 as an infected device based on the identity response.

In block 602, the MME 112 sends, to the HSS 142, an update location request including the IMSI/IMEI of the UE 102 received in the identity response, and causes the HSS 142 to send, to the IRN 116, a UE security check including the IMSI/IMEI of the UE in block 604. In 606, the IRN 116 determines if the IMSI/IMEI of the UE 102 is included in a list of known infected UEs maintained at the IRN 116. If the IMSI/IMEI of the UE 102 is not included in the list, then the SPI includes no indication of the UE 102 being infected in block 608 with no redirection for the mobile traffic of the UE 102 being required. However, if the IMSI/IMEI of the UE 102 is included in the list, then the SPI includes an indication that the UE 102 is infected, and in block 610, the IRN 116 sends to the HSS 142 a UE security check response including the SPI that indicates the UE 102 being infected. In block 612, the HSS 142 sends to the MME 112 an update location response including the SPI.

As described above, several processes for mobile traffic redirection for malicious traffic may be practiced based on various configurations.

Figure 7:
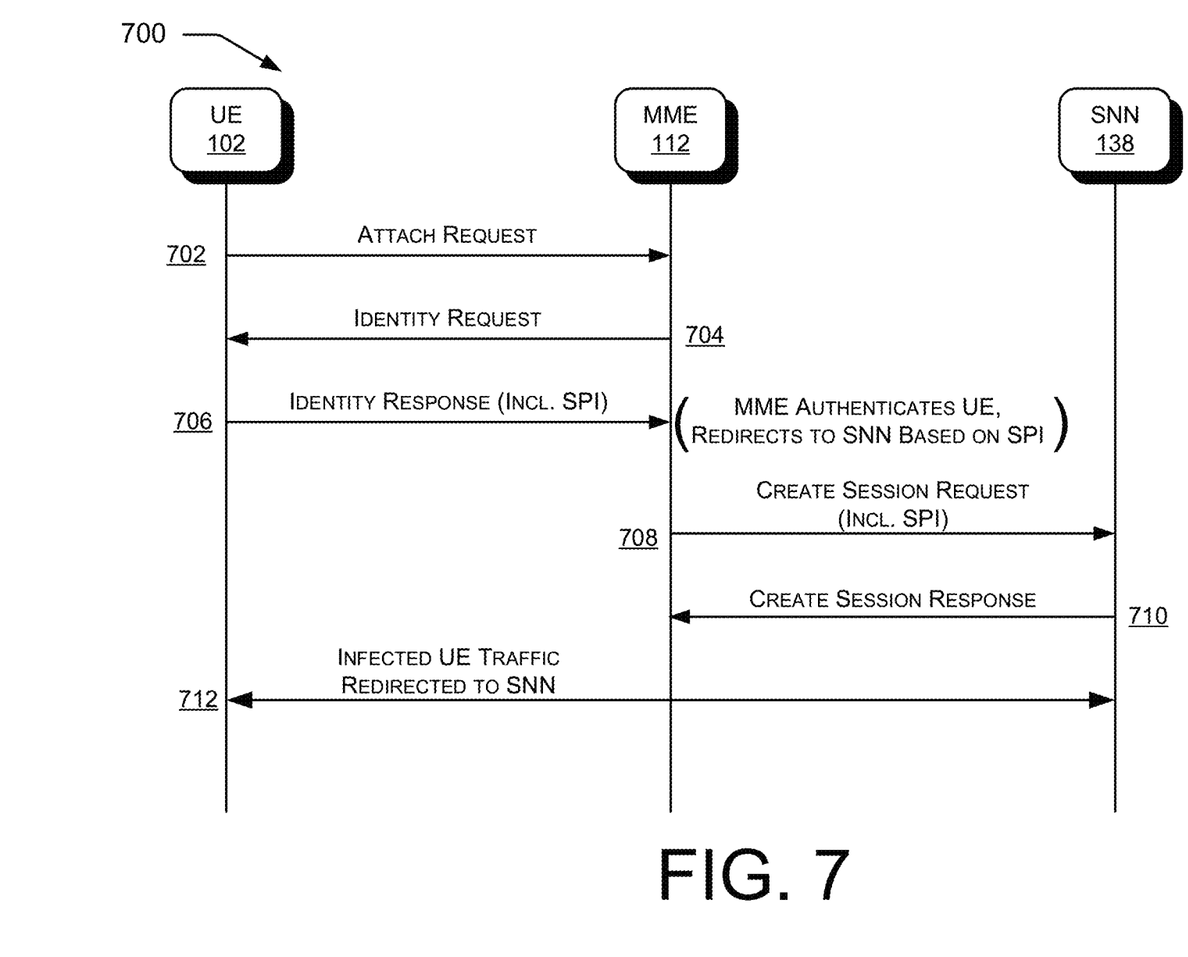
FIG. 7 illustrates a first example timing diagram for redirecting malicious mobile traffic.

FIG. 7 illustrates a first example timing diagram 700 for redirecting malicious mobile traffic.

At 702, the UE 102 sends to the MIME 112 an attach request, and in response to the attach request, the MME 112 sends an identity request to the UE 102 at 704. In response to the identity request, the UE 102 sends to the MIME 112 an identity response, including an SPI indicating that the UE 102 is infected, to the MME 112 at 706. The MME 112 authenticates the UE 102 based on the identity response, and selects the SNN 138 for redirecting the traffic of the UE 102 based on the SPI. At 708, the MME 112 sends a create session request, including the SPI, to the SNN 138. In response, the SNN 138 sends a create session response to the MME 112 at 710, and redirects the malicious traffic of the UE 102 to the SNN 138 at 712.

The SNN 138 may provide a security action for the infected UE 102 such as inspecting the mobile traffic of the UE 102 for malicious traffic and identifying a known malicious website destination included in the mobile traffic from the UE 102, or malicious traffic designed for a botnet, a distributed denial-of service attack (DDoS), a malware, and the like. The security action provided by the SNN 138 for the infected UE 102 may further include remedial actions such as quarantining the mobile traffic of the UE 102, blocking the mobile traffic of the UE 102, providing a notification to run a security application on the UE 102 to remove the infection, and automatically running the security application on the UE 102 to remove the infection such as a malware. The SNN 138 may also provide a notification of the remedial action taken by sending a notification of the remedial action provided to the UE 102, by sending a notification of the remedial action provided to the user associated with the UE 102 by a text, an email, a status update on the user's account, and the like, and by creating a report of the remedial action provided to the UE 102 for the mobile network operator of the UE 102.

Figure 8:
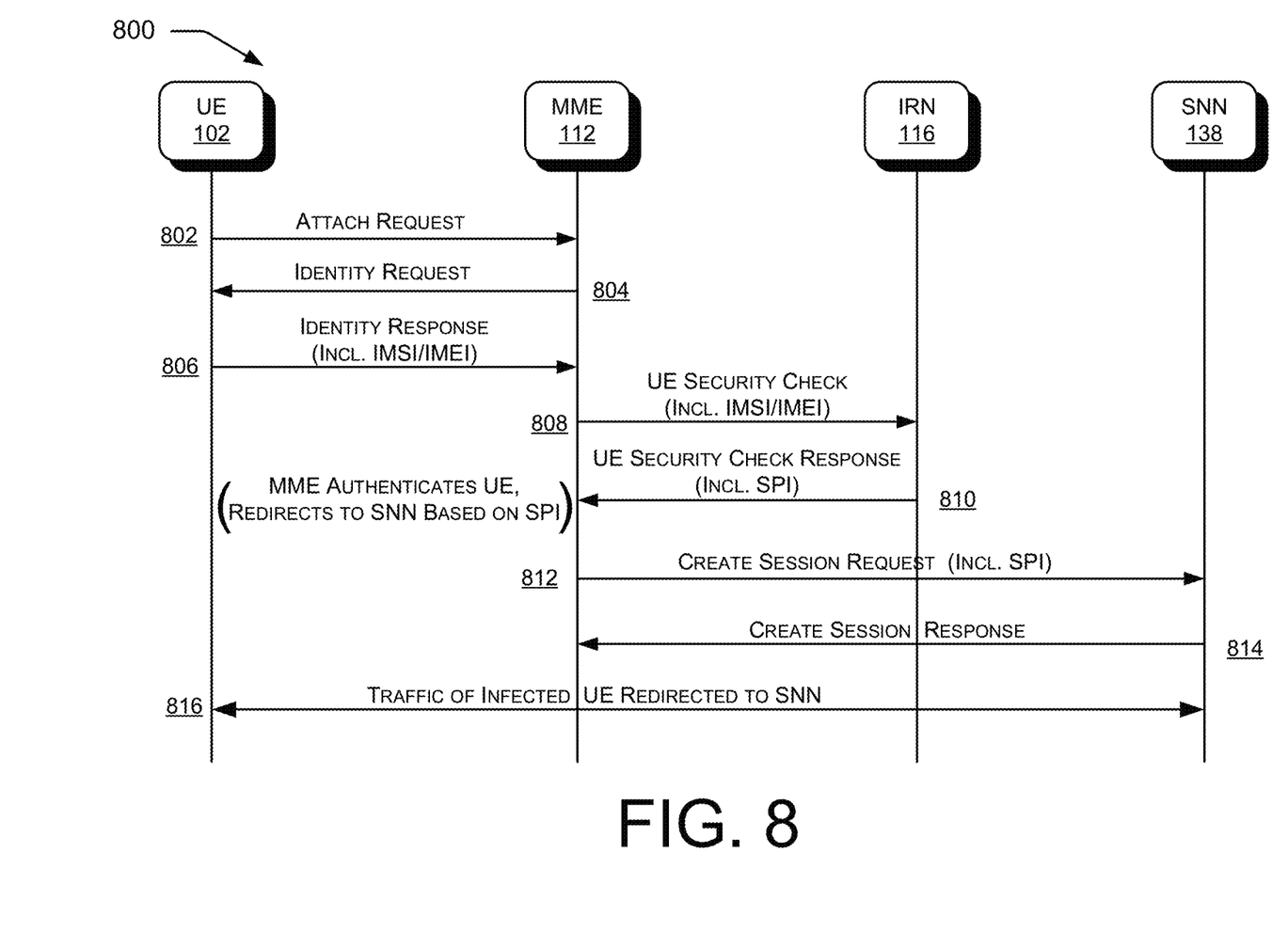
FIG. 8 illustrates a second example timing diagram for redirecting malicious mobile traffic.

FIG. 8 illustrates a second example timing diagram 800 for redirecting malicious mobile traffic.

At 802, the UE 102 sends to the MME 112 an attach request, and in response to the attach request, the MME 112 sends an identity request to the UE 102 at 804. In response to the identity request, the UE 102 sends to the MIME 112 an identity response, including the IMSI/IMEI of the UE 102 at 806. At 808, the MME 112 sends to the IRN 116 a UE security check including the IMSI/IMEI of the UE 102. The IRN 116 then determines if the IMSI/IMEI of the UE 102 is included in a list of known infected UEs maintained at the IRN 116. If the IMSI/IMEI of the UE 102 is not included in the list, then the SPI includes no indication of the UE 102 being infected with no redirection for the mobile traffic of the UE 102 being required. However, if the IMSI/IMEI of the UE 102 is included in the list, then the SPI includes an indication that the UE 102 is infected, and the IRN 116 sends to the MME 112 a UE security check response including the SPI that indicates the UE 102 being infected at 810.

The MME 112 authenticates the UE 102 based on the UE security response, and selects the SNN 138 for redirecting the traffic of the UE 102 based on the SPI indicating that the UE 102 is infected. At 812, the MME 112 sends a create session request, including the SPI, to the SNN 138. In response, the SNN 138 sends a create session response to the MME 112 at 814, and redirects the malicious traffic of the UE 102 to the SNN 138 at 816. The SNN 138 may provide similar security actions, remedial actions, and notifications discussed above with regard to FIG. 7.

Figure 9:
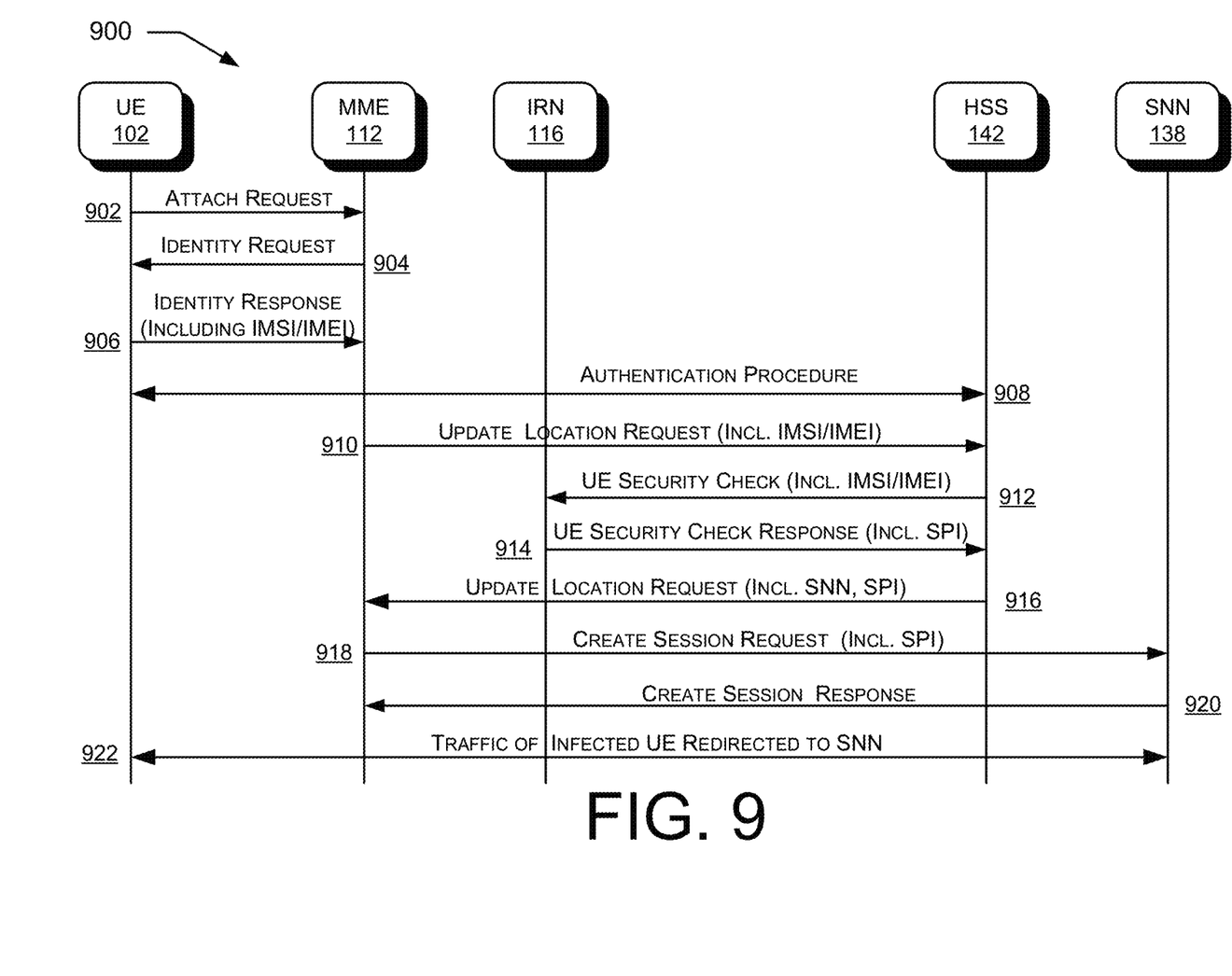
FIG. 9 illustrates a third example timing diagram for redirecting malicious mobile traffic.

FIG. 9 illustrates a third example timing diagram 900 for redirecting malicious mobile traffic.

At 902, the UE 102 sends to the MME 112 an attach request, and in response to the attach request, the MME 112 sends an identity request to the UE 102 at 904. In response to the identity request, the UE 102 sends to the MME 112 an identity response, including the IMSI/IMEI of the UE 102 at 906. The UE 102 also goes through the authentication process with the HSS 142 at 908.

At 910, the MME 112 sends an update location request including the IMSI/IMEI of the UE 102 to the HSS 142. The HSS 142 then sends to the IRN 116 a UE security check including the IMSI/IMEI of the UE 102 at 912. The IRN 116 then determines if the IMSI/IMEI of the UE 102 is included in a list of known infected UEs maintained at the IRN 116. If the IMSI of the UE 102 is not included in the list, then the SPI includes no indication of the UE 102 being infected with no redirection for the mobile traffic of the UE 102 being required. However, if the IMSI/IMEI of the UE 102 is included in the list, then the SPI includes an indication that the UE 102 is infected. The IRN 116 sends to the HSS 142 a UE security check response including the SPI that indicates the UE 102 being infected at 914. The HSS 142 then sends to the MME an update location response including the SPI and a selection of a security S/PGW, namely the SNN 138 at 916. At 918, the MME 112 sends a create session request, including the SPI, to the SNN 138. In response, the SNN 138 sends a create session response to the MME 112 at 920, and redirects the malicious traffic of the UE 102 to the SNN 138 at 922. The SNN 138 may provide similar security actions, remedial actions, and notifications discussed above with regard to FIG. 7.

Figure 10:
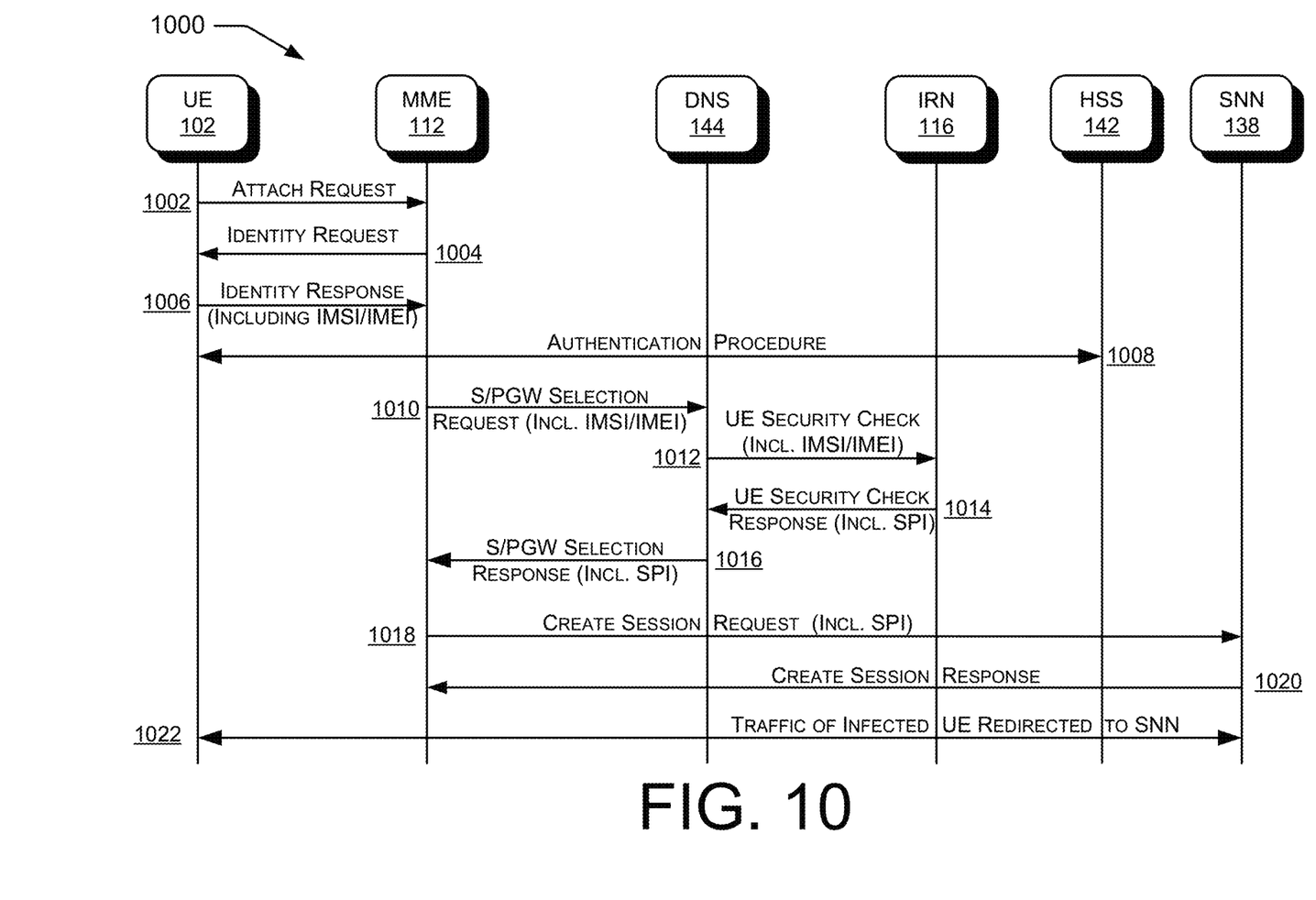
FIG. 10 illustrates a fourth example timing diagram for redirecting malicious mobile traffic.

FIG. 10 illustrates a fourth example timing diagram 1000 for redirecting malicious mobile traffic.

At 1002, the UE 102 sends to the MME 112 an attach request, and in response to the attach request, the MME 112 sends an identity request to the UE 102 at 1004. In response to the identity request, the UE 102 sends to the MIME 112 an identity response, including the IMSI/IMEI of the UE 102 at 1006. The UE 102 also goes through the authentication process with the HSS 142 at 1008.

At 1010, the MME 112 sends an S/PGW selection request including the IMSI/IMEI of the UE 102 to the DNS 144. The DNS 144 then sends to the IRN 116 a UE security check including the IMSI/IMEI of the UE 102 at 1012. The IRN 116 then determines if the IMSI/IMEI of the UE 102 is included in a list of known infected UEs maintained at the IRN 116. If the IMSI/IMEI of the UE 102 is not included in the list, then the SPI includes no indication of the UE 102 being infected with no redirection for the mobile traffic of the UE 102 being required. However, if the IMSI/IMEI of the UE 102 is included in the list, then the SPI includes an indication that the UE 102 is infected. The IRN 116 sends to the DNS 144 a UE security check response including the SPI that indicates the UE 102 being infected at 1014. The DNS 144 then sends to the MME an S/PGW selection response including the SPI and a selection of a security S/PGW, namely the SNN 138 at 1016. At 1018, the MME 112 sends a create session request, including the SPI, to the SNN 138. In response, the SNN 138 sends a create session response to the MIME 112 at 1020, and redirects the malicious traffic of the UE 102 to the SNN 138 at 1022. The SNN 138 may provide similar security actions, remedial actions, and notifications discussed above with regard to FIG. 7.

Some or all operations of the methods described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

The computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more computer storage media that, when executed by one or more processors, perform operations described above with reference to FIGS. 2-10. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 11:
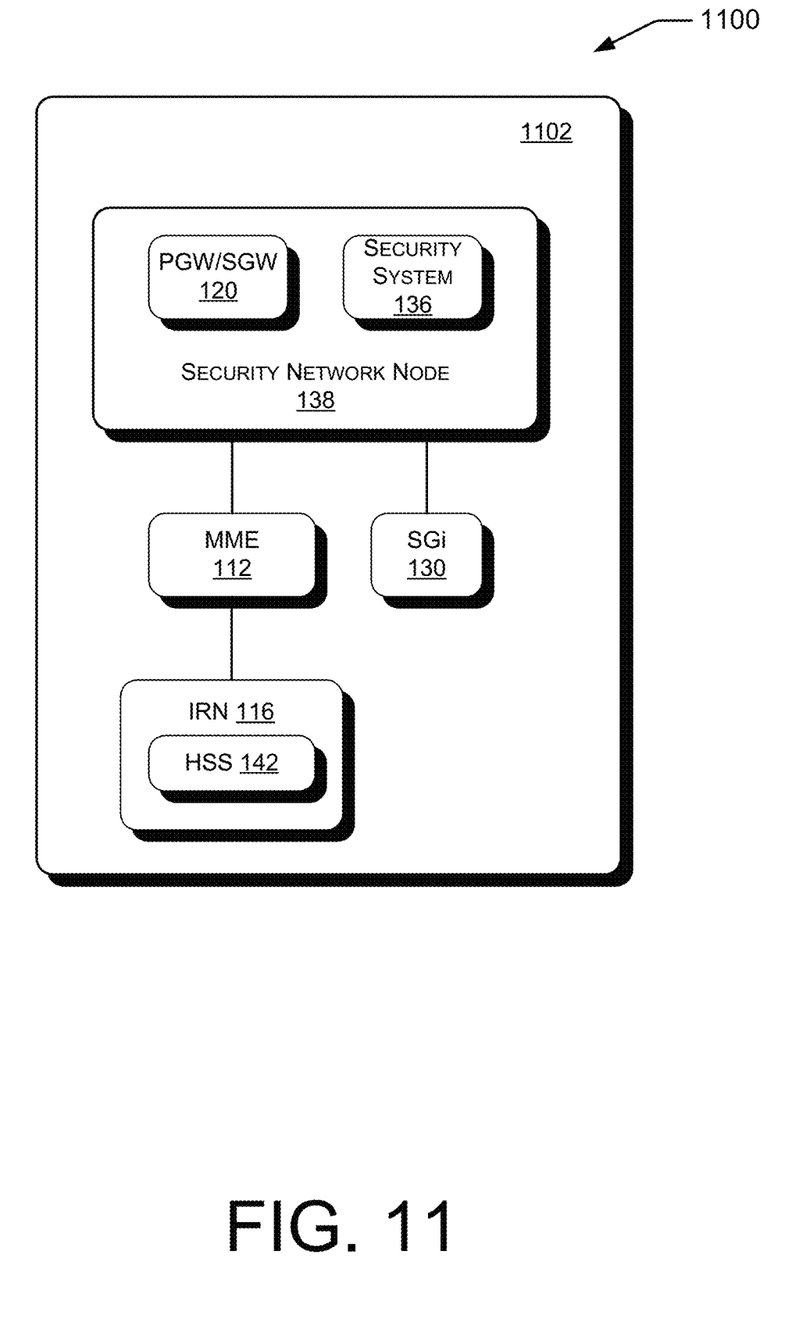
FIG. 11 illustrates an example block diagram of a mobile traffic redirection system.

FIG. 11 illustrates an example block diagram 1100 of a mobile traffic redirection system 1002.

The mobile traffic redirection system 1102 may comprise a mobile management entity, such as the MME 112, an intelligent redirection node, such as the IRN 116, that is communicable coupled to the MME 112, and a security network node, such as the SNN 138, communicably coupled to the MME 112. As described above with reference to FIGS. 2, 4, 6, 8, and 9, the MME 112 is configured to send an identity request to a user equipment (UE), such as the UE 102, in response to receiving an attach request from the UE 102. The MME 112 is further configured to receive, from the UE 102 in response to sending the identity request, an identity response that includes at least one of an international mobile subscriber identity (IMSI) or an international mobile equipment identity (IMEI) of the UE 102.

The IRN 116 is configured to receive, from the MME 112, a UE security check including the IMSI/IMEI of the UE 102, and to send, to the MME 112, a UE security check response including a security posture indicator (SPI), which include an indication of the UE 102 being infected based upon determining that the IMSI/IMEI of the UE 102 is included in a list of known infected UEs maintained at the IRN 116 as described above with reference to FIGS. 2, 4, 6, 8, and 9.

The SNN 138 may comprise at least a PGW or a SGN, such as the PGN/SGW 120, and a security system such as the security system 136. The SNN 138 may connect to a packet data network, such as the Internet 126, via an SGi interface, such as the SGi 130. The SNN 138 is configured to receive, from the MME 112, a create session request including the SPI indicating that the UE 102 is infected, send, to the MME 112, a create session response, redirect mobile traffic of the UE 102 to the SNN 138, and provide a security action for the mobile traffic of the UE 102 as described above with reference to FIGS. 2, 4, 6, 8, and 9.

The SNN 138 may provide a security action for the infected UE 102 such as inspecting the mobile traffic of the UE 102 for malicious traffic and identifying a known malicious website destination included in the mobile traffic from the UE 102, or malicious traffic designed for a botnet, a distributed denial-of service attack (DDoS), a malware, and the like. The security action provided by the SNN 138 for the infected UE 102 may further include remedial actions such as quarantining the mobile traffic of the UE 102, blocking the mobile traffic of the UE 102, providing a notification to run a security application on the UE 102 to remove the infection, and automatically running the security application on the UE 102 to remove the infection such as a malware. The SNN 138 may also provide a notification of the remedial action taken by sending a notification of the remedial action provided to the UE 102, by sending a notification of the remedial action provided to the user associated with the UE 102 by a text, an email, a status update on the user's account, and the like, and by creating a report of the remedial action provided to the UE 102 for the mobile network operator of the UE 102.

The IRN 116 of the mobile traffic redirection system 1102 may further comprise a home subscriber server (HSS), such as the HSS 142. The HSS 142 may be configured to authenticate the UE 102, receive, from the MME 112, an update location request including the IMSI/IMEI of the UE 102, send, to the IRN 116, the UE security check including the IMSI/IMEI of the UE 102, receive, from the IRN 116, the UE security check response including the SPI, and send, to the MME 112, an update location response including the SPI and SNN information. The SNN information include a selection of a particular PGW/SGW having a security system such as the SNN 138.

Each of the MME 112, the IRN 116, the SNN 138, and the HSS 142, may comprise one or more processors and one or more memories, and may be capable of executing computer-readable instructions described above.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method in a mobile session management node (MSMN) for redirecting mobile traffic, the method comprising:

receiving an attach request from a user equipment (UE);

sending, by the MSMN, an identity request to the UE in response to receiving the attach request;

receiving, at the MSMN, an identity response from the UE, the identity response including mobile identity information associated with the UE;

sending, from the MSMN to an intelligent redirection node (IRN), a UE security check including the mobile identity information;

receiving, at the MSMN from the IRN, a UE security check response including a security posture indicator (SPI), the SPI including an indication of the UE being infected based upon determining that the mobile identity information of the UE is included in a list of known infected UEs maintained at the IRN;

creating, by the MSMN and based at least in part on the UE being identified as the infected device by the IRN, a session between a security network node (SNN) and the UE in response to the attach request;
redirecting mobile traffic of the UE to the SNN; and
causing the SNN to provide a security action for the UE.

2. The method of claim 1, wherein the security action for the UE comprises:
inspecting the mobile traffic of the UE for malicious traffic;
providing, as a provided remedial action, at least one of remedial actions comprising:
quarantining the mobile traffic of the UE;
blocking the mobile traffic of the UE;
providing a notification to run a security application on the UE to remove an infection associated with the UE; or
causing the UE to run the security application on the UE to remove the infection; and
providing a notification of the provided remedial action, the notification comprising at least one of:
sending, to the UE, a notification of the provided remedial action;
sending, to a user associated with the UE, a notification of the provided remedial action; or
creating a report of the provided remedial action for a mobile network provider of the UE.

3. The method of claim 2, wherein inspecting the mobile traffic of the UE for malicious traffic comprises:
identifying a known malicious website destination included in the mobile traffic from the UE.

4. The method of claim 2, wherein:
the mobile identity information of the UE comprises at least one of an international mobile subscriber identity (IMSI) or an international mobile equipment identity (IMEI) of the UE received in the identity response.

5. The method of claim 2, wherein identifying the UE as an infected device based on the identity response comprises:
sending, to a domain name server (DNS), a serving gateway (SGW) and a packet data network gateway (PGW) (S/PGW) selection request including the mobile identity information of the UE comprising at least one of an international mobile subscriber identity (IMSI) or an international mobile equipment identity (IMEI) of the UE received in the identity response;
causing the DNS to:
send, to the IRN, the UE security check including the mobile identity information of the UE; and
receive, from the IRN, the UE security check; and
receiving, from the DNS, an S/PGW selection response including the SPI.

6. The method of claim 2, wherein identifying the UE as an infected device comprises:
sending, to a home subscriber server (HSS), an update location request including the mobile identity information of the UE comprising at least one of an international mobile subscriber identity (IMSI) or an international mobile equipment identity (IMEI) of the UE received in the identity response;
causing the HSS to send, to the IRN, the UE security check and receive, from the IRN, the UE security check response; and
receiving, from the HSS, an update location response including the SPI.

7. A non-transitory computer storage medium configured to store computer-readable instructions, that when executed, cause a computer to perform operations comprising:
sending an identity request to a user equipment (UE) in response to receiving an attach request from the UE;
receiving an identity response from the UE, the identity response including mobile identity information associated with the UE;
sending, from the MSMN to an intelligent redirection node (IRN), a UE security check including the mobile identity information;
receiving, from the IRN, a UE security check response including a security posture indicator (SPI), the SPI including an indication of the UE being infected based upon determining that the mobile identity information of the UE is included in a list of known infected UEs maintained at the IRN;
creating, based at least in part on the infected device being identified by the IRN, a session between a security network node (SNN) and the UE in response to the attach request;
redirecting mobile traffic of the UE to the SNN;
causing the SNN to provide a security action for the UE, the security action including:
inspecting the mobile traffic of the UE for malicious traffic; and
providing, as a provided remedial action, at least one of remedial actions comprising:
quarantining the mobile traffic of the UE; or
blocking the mobile traffic of the UE.

8. The non-transitory computer storage medium of claim 7, wherein the security action for the UE further comprises:
providing a notification of the provided remedial action, the notification comprising at least one of:
sending, to the UE, a notification of the provided remedial action;
sending, to a user associated with the UE, a notification of the provided remedial action; or
creating a report of the provided remedial action for a mobile network provider of the UE.

9. The non-transitory computer storage medium of claim 8, wherein inspecting the mobile traffic of the UE for malicious traffic comprises:
identifying a known malicious website destination included in the mobile traffic from the UE.

10. The non-transitory computer storage medium of claim 8, wherein identifying the UE as an infected device based on the identity response comprises:
analyzing a security posture indicator (SPI) included in the identity response for an indication of the UE being infected, the indication generated by the security application running on the UE.

11. The non-transitory computer storage medium of claim 8, wherein:
the mobile identity information of the UE comprise at least one of an international mobile subscriber identity (IMSI) or an international mobile equipment identity (IMEI) of the UE received in the identity response.

12. The non-transitory computer storage medium of claim 8, wherein identifying the UE as an infected device comprises:
sending, to a domain name server (DNS), a serving gateway (SGW) and a packet data network gateway (PGW) (S/PGW) selection request, along with the mobile identity information of the UE comprising at least one of an international mobile subscriber identity (IMSI) or an international mobile equipment identity (IMEI) of the UE received in the identity response;
causing the DNS to:

send, to the IRN, a UE security check including the mobile identity information of the UE; and receive, from the IRN, a UE security check response including a security posture indicator (SPI), the SPI indicating that the UE is infected based upon determining that the mobile identity information of the UE is included in a list of known infected UEs maintained at the IRN; and receiving, from the DNS, an S/PGW selection response including the SPI.

13. The non-transitory computer storage medium of claim 8, wherein identifying the UE as an infected device comprises:

sending, to a home subscriber server (HSS), an update location request, along with the mobile identity information of the UE comprising at least one of an international mobile subscriber identity (IMSI) or an international mobile equipment identity (IMEI) of the UE received in the identity response;

causing the HSS to send, to the IRN, the UE security check including and receive, from the IRN, the UE security check response; and receiving, from the HSS, an update location response including the SPI.

14. A mobile traffic redirection system comprising:
a mobile session management node configured to:
  send an identity request to a user equipment (UE) in response to receiving an attach request from the UE; and
  receive an identity response from the UE in response to sending the identity request, the identity response including mobile identity information comprising at least one of an international mobile subscriber identity (IMSI) or an international mobile equipment identity (IMEI) of the UE;
an intelligent redirection node (IRN) communicatively coupled to the mobile session management node, the IRN configured to:
  receive, from the mobile session management node, a UE security check including the mobile identity information; and
  send, to the mobile session management node, a UE security check response including a security posture indicator (SPI), the SPI including an indication of the UE being infected based upon determining that the mobile identity information of the UE is included in a list of known infected UEs maintained at the IRN; and
a security network node (SNN) communicatively coupled to the mobile session management node and the UE, the SNN configured to:
  receive, from the mobile session management node and based at least on the UE security check response sent by the IRN, a create session request including the SPI in response to the attach request;
  send, to the mobile session management node, a create session response;
  receive, from the UE, redirected mobile traffic; and
  provide a security action for the mobile traffic of the UE.

15. The mobile traffic redirection system of claim 14, wherein the security action for the mobile traffic of the UE comprises:
  inspecting the mobile traffic of the UE for malicious traffic;
  providing, as a provided remedial action, at least one of remedial actions comprising:
    quarantining the mobile traffic of the UE;
    blocking the mobile traffic of the UE;
    providing a notification to run a security application on the UE to remove an infection associated with the UE; or
    causing the UE to run the security application on the UE to remove the infection; and
  providing a notification of the provided remedial action, the notification comprising at least one of:
    sending, to the UE, a notification of the provided remedial action;
    sending, to a user associated with the UE, a notification of the provided remedial action; and
    creating a report of the provided remedial action for a mobile network provider of the UE.

16. The mobile traffic redirection system of claim 15, wherein inspecting the mobile traffic of the UE for malicious traffic comprises:
  identifying a known malicious website destination included in the mobile traffic from the UE.

17. The mobile traffic redirection system of claim 15, wherein the IRN comprises a home subscriber server (HSS), the HSS configured to:
  authenticate the UE;
  receive, from the mobile session management node, an update location request including the mobile identity information;
  send, to the IRN, the UE security check including the mobile identity information;
  receive, from the IRN, the UE security check response including the SPI; and
  send, to the mobile session management node, an update location response including the SPI and SNN information.

18. The mobile traffic redirection system of claim 15, wherein the SNN is at least one of a packet data network gateway (PGW) or a serving gateway (SGW).

* * * * *